United States Patent [19]

Kucharczyk

[11] 4,319,169

[45] Mar. 9, 1982

[54] SAFETY CONTROL UNIT

[75] Inventor: Eckhard Kucharczyk, Netphen, Fed. Rep. of Germany

[73] Assignee: Siegenia-Frank AG, Siegen, Fed. Rep. of Germany

[21] Appl. No.: 201,203

[22] Filed: Oct. 27, 1980

Related U.S. Application Data

[63] Continuation of Ser. No. 31,547, Apr. 9, 1979, abandoned.

[30] Foreign Application Priority Data

Apr. 27, 1978 [DE] Fed. Rep. of Germany ....... 2818461

[51] Int. Cl.³ .............................................. H02P 1/42
[52] U.S. Cl. .................................. 318/266; 318/282; 318/286; 318/467

[58] Field of Search ............... 318/264, 265, 266, 267, 318/282, 286, 467, 446

[56] References Cited

U.S. PATENT DOCUMENTS

| | | | |
|---|---|---|---|
| 3,434,027 | 3/1969 | Cummings | 318/282 |
| 3,611,083 | 10/1971 | Halsted | 318/266 X |
| 4,010,408 | 3/1977 | Bailey | 318/266 |

FOREIGN PATENT DOCUMENTS 2027816  12/1971  Fed. Rep. of Germany.

*Primary Examiner*—B. Dobeck
*Attorney, Agent, or Firm*—Norman S. Blodgett; Gerry A. Blodgett

[57] ABSTRACT

Safety control unit using a self-starting single-phase synchronous a.c. motor with a register closure.

7 Claims, 8 Drawing Figures

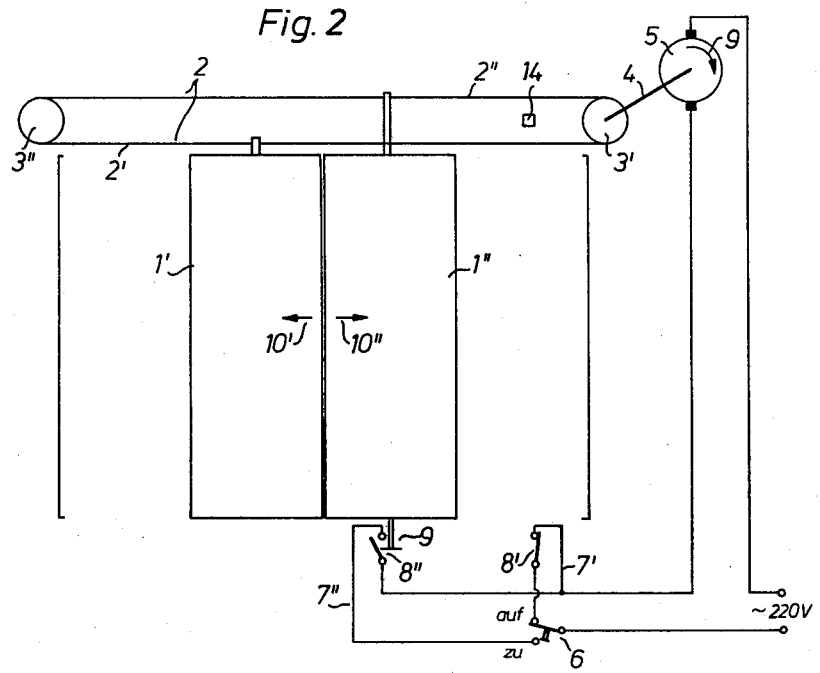
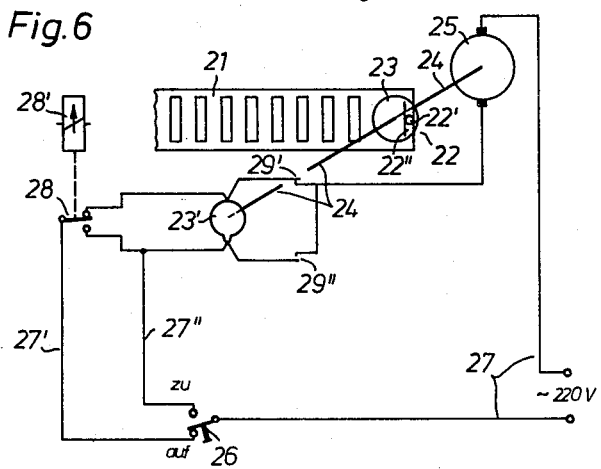

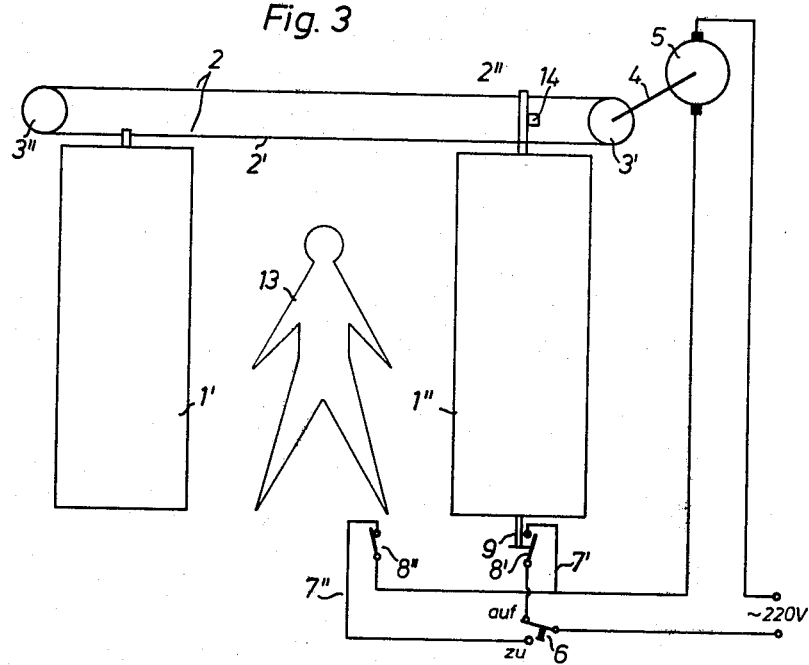
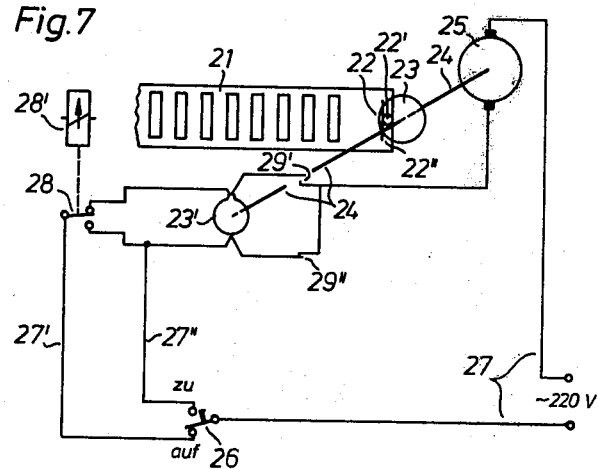

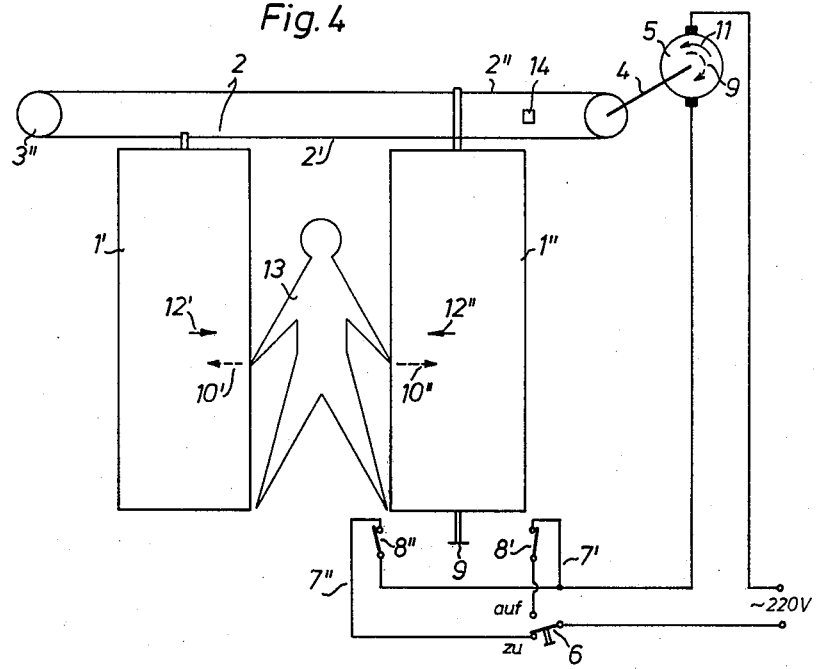
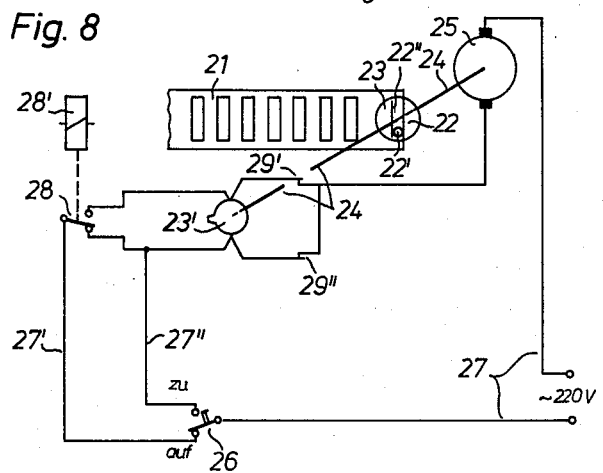

SAFETY CONTROL UNIT

This is a continuation, of application Ser. No. 31,547 filed Apr. 9, 1979, now abandoned.

BACKGROUND OF THE INVENTION

Openings in the walls of buildings, such as doors, windows, and ventilation openings, are generally provided with closure elements that permit the blocking or freeing of these openings as needed. In many cases control units are connected to the closure elements to effect a power-operated opening or closing of the openings in response to control pulses. To comply with the rules for accident prevention set forth by the leading association of employer's liability insurance companies, it is required that the regulating drives be so designed that, when there is danger of a jamming, the closing operation of the closure elements at least is immediately interrupted.

In the case of power-operated windows, doors, and gates it is known to use as control units geared electric motors which operate either with a limit on the regulating force operating by means of a built-in slip clutch or with a safety circuitry which automatically reacts to any obstacle that is present in the path of motion of the closure elements. While the slip clutches react purely mechanically to obstacles in the path of motion of the closure elements, that is, are triggered through the braking resistance caused by the particular obstacle, the safety circuitry can be made to respond through touch-contacts as well as non-contacting means, such as light barriers, Doppler radar, etc.

The electric motors usually employed as control unit drive are single or multiple-phase asynchronous motors, particularly induction or capacitor motors. Such asynchronous motors are used, because they permit practical operation in a simple manner a reliable reversal of motion to bring about motions of the closure element in opposite directions. In the case of ventilation appliances for rooms, it is likewise already part of the state of art to actuate the closure elements of the ventilation openings, such as flaps, by means of an electric asynchronous motor. The asynchronous motor is connected by means of a tightly-wound coil spring with the closure element in a driving connection, and is so arranged or developed that, when the closure element strikes an obstacle during its closing motion, it is able to stop, although the driving motion of the asynchronous motor continues until it has reached its end position corresponding to the stop position of the closure element. In order to comply with the rules for accident prevention it is necessary with all the known control unit drives described above for the use on wall openings, etc. which bring about not only a high technical expenditure, but also increase the incidence of trouble.

It is, therefore, an outstanding object of the invention to provide a safety control unit drive for wall openings in buildings, etc. that interrupts (without special precautionary measures) any specific motional operation of the closure element as soon as it strikes an obstacle in its path of motion.

These and other difficulties experienced with the prior art devices have been obviated in a novel manner by the present invention.

With these and other objects in view, as will be apparent to those skilled in the art, the invention resides in the combination of parts set forth in the specification and covered by the claims appended hereto.

SUMMARY OF THE INVENTION

In general, the invention consists of a safety control unit using a self-starting single-phase synchronous a.c. motor in a structural component which is movable back and fourth between two predetermined end positions, such as a closed position and an open position, particularly a register or ventilation flap that can be brought to a stop in any optionally preselective end position. It is a characteristic feature of self-starting single-phase synchronous a.c. motors that they have no definite starting direction of rotation, but will start to operate with clockwise or counter-clockwise rotation, unless they are equipped with an electrically-effective dampening winding or a mechanically operative return stop through which a particular starting direction is given. Another characteristic of self-starting single-phase synchronous a.c. motors is that the electric field excited by d.c. current remains normally at rest against the field magnet, that is, that the field exciting curve of the currents rotates synchronously with the speed dependent on the line frequency and the number of pairs of poles of the armature. If, however, the armature speed drops, because of an opposingly active braking resistance, then the field curve slips against the field magnet with the result that the torque spontaneously changes direction.

The present invention makes use of these characteristic features of single-phase synchronous a.c. motors for its safety control unit. Namely, since the mobility of the component to-be-moved is limited by two exactly defined end positions, it is without significance for the initiation of the respective regulating motion whether the single-phase synchronous a.c. motor in the specific existing end position of the component immediately starts in the desired regulating direction, or in opposition to it. Because of its operational characteristic it will adjust itself fully automatically to move the component in the direction away from the end position that it has just occupied.

If the component now meets an obstacle somewhere between its two fixed end positions, the same effect results spontaneously, because of the rising braking resistance, the field curve slips against the direction of the torque in the single-phase synchronous a.c. motor. The result is that the component retains opposite to the given regulating direction up to the final position it previously left. From there, it immediately starts a renewed motion in the given regulating direction. If the obstacle is then no longer existent, then the component is moved until it reaches the preselected end position and there stopped.

The utilization of such a safety control unit has proved especially advantageous with a thurst crank that operates exclusively in one of two possible directions of motion against a braking resistance and that can be automatically stopped in one optionally-selective dead-center position. Such slider crank mechanisms have especially proved themselves where short regulating paths are used, for example, in the actuation of ventilation registers or ventilation flaps. Through the two dead-center positions of the thrust crank it becomes possible to fix these registers or flaps in a simple manner, on the one hand, in their closed position and, on the other hand, in their open position. It is, thereby, also possible to provide a certain sealing contact pressure at least in the blocking position through the thrust crank.

An advantageous development of the safety control unit of the invention consists in the fact that any specific end position of the component can be preselected via a make-break contact and can be controlled via two micro-switches which are arranged in different line branches behind the make-break contact and which can be opened and closed via a disc cam driven by the synchronous a.c. motor. The make-break contact can hereby be actuated to advantage manually or through remote control. However, it is particularly advantageous if each one make-break contact is manually operable and one that is operated through remote control; in that case the remote-control make-break contact lies in one of two selectable line branches that are controllable through the manual make-break contact, while the other line branch assigned to the manually-operated contact, on the other hand, is in communication with one of the two line branches controllable through the remote-controlled make-break contact and containing one of the two micro-switches. In this case, the manually operated make-break contact practically undertakes the function of the main switch, while the remote-controlled make-break contact acts as an auxiliary switch which takes over the functional control of the safety control unit in a well-defined operative position of the main switch.

BRIEF DESCRIPTION OF THE DRAWINGS

The character of the invention, however, may be best understood by reference to one of its structural forms, as illustrated by the accompanying drawings, in which:

FIGS. 1 to 4 show in diagrammatically simplified form the application and the method of operation of a safety control unit of the invention used on a sliding door or the like, and FIGS. 5 to 8 likewise in diagrammatically simplified presentation the application and method of operation of a safety control unit of the invention for a ventilation register.

DESCRIPTION OF THE PREFERRED EMBODIMENT

Figure 1:
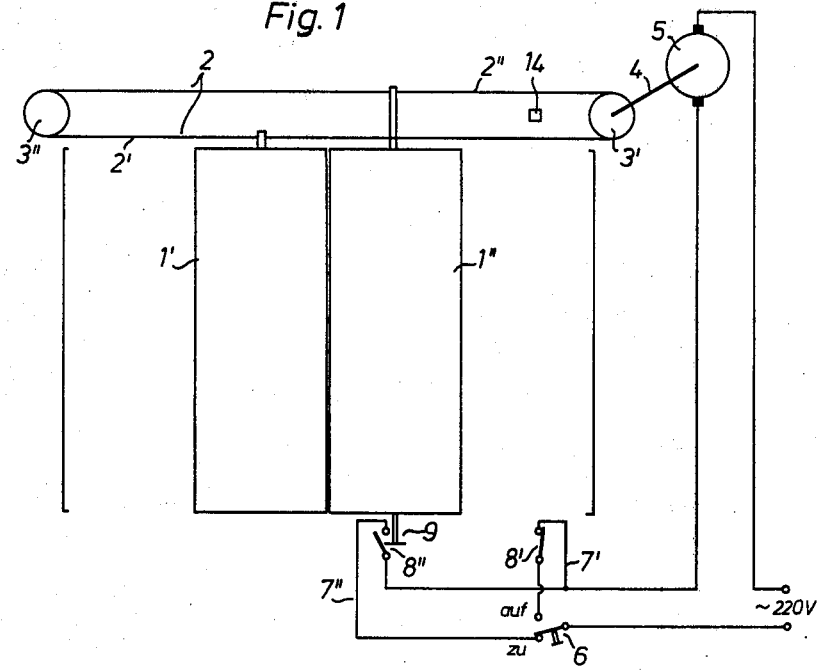

FIGS. 1 to 4 show a sliding door with two oppositely-movable wings 1' and 1". For the power-actuated motion these door wings 1' and 1" are suspended on two different strands 2' and 2" of an endless drawing means 2, for example, a toothed V-belt, which runs over two deviating wheels 3' and 3". The deviating wheel 3' is rotated by a shaft 4 which is driven by a single-phase synchronous a.c. motor 5 preferably designed as gear motor. The signle-phase synchronous a.c. motor 5 can be connected to the line 7 via a switch 6, which is constructed e.g. as a make-break contact that cooperates with two different line branches 7' and 7".

In the line branch 7' lies a limit switch 8', while the line branch 7" has a corresponding limit switch 8".

On at least one of the two door wings 1' and 1", for instance, at the door wing 1", is provided a sequence switch cam 9 which cooperates alternatingly with the two limit switches 8' and 8". Through this is opened in the closing position of the door the limit switch 8" via the sequence switch cam 9, as can be seen from FIGS. 1 and 2.

On the other hand the limit switch 8' is pressed through the sequence switch cam 9 into open position as soon as the door wings 1' and 1" have reached their open position according to FIG. 3.

According to FIG. 1 the make-break contact 6 is connected with the line branch 7" which controls the movement of the two door wings 1' and 1" into their closed position. In the closed position the limit switch 8" is open, so that the sliding door remains in its closed position.

If the make-break contact 6 is connected as shown in FIG. 2 with the line branch 7', whose limit switch 8' is closed, then the single-phase synchronous a.c. motor 5 again receives current and starts. The door wings 1' and 1" striking against each other in the closed position permit a starting of the single-phase synchronous a.c. motor 5 only in the direction of rotation as indicated by the arrow 9', so that the motor pushes the door wings 1' and 1" through the endless drawing means 2 in the opening sense, that is to say, corresponding to the directions of the arrows 10' and 10" in FIG. 2.

When then the open end position of the door wings 1' and 1" of FIG. 3 has been reached, the limit switch 8' is opened and the single-phase synchronous a.c. motor is thereby again disconnected from the main. The make-break contact 6 can now be reversed again, i.e., be separated from the line branch 7' and be connected to the line branch 7". Because in the latter the limit switch 8" is closed, the single-phase synchronous a.c. motor 5 is now again connected with the main. But as the two door wings 1' and 1" can not move any further in the opening direction, the single-phase synchronous a.c. motor 5 is compelled to run in the direction of the arrow 11, see FIG. 3. In this way, it moves the two door wings 1' and 1" in the "closing" sense corresponding to the arrows 12' and 12" of FIGS. 3 and 4.

Now, if even one of the two door wings 1' and 1" strikes an obstacle, such as a person, in the course of its closing motion, a braking resistance then quite naturally acts on it, which resistance reacts via the endless drawing means 2 and the drive wheel 3' onto the single-phase synchronous a.c. motor 5. On account of the existing operational characteristic, a slippage of the field exciting curve relative to the field magnet of the single-phase synchronous a.c. motor, which triggers spontaneously a reversal of direction of rotation. The resulting rotational reversal of the single-phase synchronous a.c. motor 5 then allows the door wings 1' and 1" to run again back in the direction contrary to the direction of the arrow 12' or 12", that is to say, in the direction of arrows 10' and 10", until the door wings have reached their open end position (FIG. 3). As this open end position is exactly defined by a stop 14, there arises again a braking resistance which reacts via the endless drawing means 2 and the drive wheel 3' on the single-phase synchronous a.c. motor 5. The resulting slippage of the field curve relative to the field magnet leads again to a spontaneous reversal of direction of the torque with the result that the single-phase synchronous a.c. motor 5 again moves the door wings 1' and 1" in direction of the arrows 12' and 12", that is to say, in the "closing" sense. When the obstacle is no longer present, the door wings 1' and 1" arrive at the closed position of FIG. 1 in which the limit switch 8" then opens and disconnects the single-phase synchronous a.c. motor 5 from the main.

FIGS. 5 to 8 of the drawing show the application of a safety control unit to a register 21 which frees or blocks the air passages of a ventilation appliance. The movement of the register 21 is generated by a slider crank mechanism 22 which consists of a crankpin 22' extending from a disc 23 and a sliding block 22" connected to the register 21.

The disc 23 is rigidly keyed to a shaft 24, which forms the output shaft of a single-phase synchronous a.c. motor 25, which is designed, for example, as a gear motor.

Secured against rotation on the driven shaft 24 sits another disc cam 23' which is subjected to an angular turning corresponding to that of the disc 23.

Figure 5:
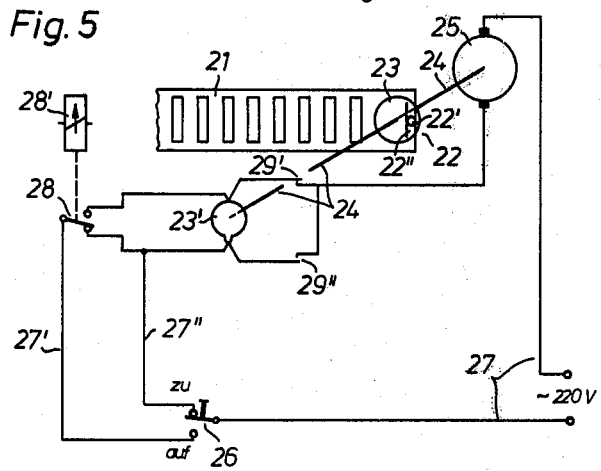

In the closed position of the ventilation appliance, the register 21 occupies the position shown in FIGS. 5 and 6 in which the crankpin 22' extending from the disc 23 has the right-hand dead-center position, relative to the regulating direction of the register 21.

When the ventilation appliance is opened, the register 21 is situated in the position shown in FIG. 7 in which the crankpin 22' of the disc 23 occupies its left-hand dead-center position.

By means of a switch 26, such as a manually operable switch designed as a make-break circuit, the single-phase synchronous a.c. motor 25 can be connected with the main 27. The make-break contact switch 26 works with two different branch lines 27' and 27" in unison. Into the branch line 27' is laid a second make-break contact 28 which can be remote-controlled, for example, by a relay 28'. This make-break switch 28 cooperates with two other line branches; in one branch line is arranged a micro-switch 29' and in the other branch line a micro switch 29". The two micro-switches 29' and 29" are controlled by means of the disc cam 23'.

The second branch line 27" assigned to the make-break switch 26 is directly connected with the line branch which contains the micro-switch 29".

Assuming that the ventilation appliance is in its closed position, as is evident in FIG. 5, in this functional position the manually-operated make-break switch 26 is connected with the branch line 27" and the micro-switch 29'. The latter is brought by the disc cam 28' into the open position. At the same time the micro-switch 29' is in its closed position.

An opening of the ventilation appliance can only be triggered through adjustment of the register 21 when the make-break contact 26 has first been brought from its position in FIG. 5 into the position in FIG. 6, that is, separated from the branch line 27" and connected with the branch line 27'.

The reversal of the make-break switch 26 into the position of FIG. 6 has, however, no result, so long as the second make-break switch 28 arranged in the branch line 27 still occupies the position shown in FIG. 5, because the micro-switch 29" is then open.

Only after an additional occurrence takes place does the relay 28' respond and bring the make-break switch 28 into the switching position of FIG. 6, so that the single-phase synchronous a.c. motor 25 is connected to the main via the closed micro-switch 29'.

Since this operates the slider crank mechanism 22 (whose right-hand dead-center position is determined through the opening of the micro-switch 29" by the disc cam 23'), the single-phase synchronous a.c. motor 26 can start up in either of the two possible directions of motion in order to move the register 21 in direction of the open position of FIG. 7. The micro-switch 29' remains closed until the register 21 has reached the position of FIG. 7 and brings the slider crank mechanism to its left-hand, dead-center position. At this moment the micro-switch 29' opens and disconnects the single-phase synchronous a.c. motor 25 from the main, although the micro-switch 29" has already arrived in its "closing" position.

If the occurrence ceases which has lead to the response of relay 28', or if the make-break contact 26 is again brought into the position of FIG. 5, when the make-break switch 28 is returned and the single-phase synchronous a.c. motor 25 is connected thereby by the micro-switch 29" with the main. Also, in the left-hand, dead-center position of the slider crank mechanism 22 of FIG. 7, it is immaterial in which direction of motion the single-phase synchronous a.c. motor 25 starts up in order to return the register 21 to is closed position.

If a braking resistance that is opposite to the respective specific direction of motion acts on the register 11 during its motion brought about by the slider crank mechanism 22, then this braking resistance acts via the slider crank mechanism 22 on the single-phase synchronous a.c. motor 25 and triggers in it a slippage of the field-exciting curve against the field magnet. This then results in a spontaneous reversal of motion of the motor through by which the register automatically evades the existing braking resistance, because it shifts opposite to the original direction of motion. However, since in this case the respective micro-switch remains closed as a result of the reversal of motion, the slider crank mechanism 22 runs past its dead-center position and moves the register in the originally intended regulating direction again. When the braking resistance which acts against this regulating direction then ceases, the register 21 is brought into the given end position and stopped there through the opening of the micro-switch assigned to this function.

It should be mentioned that the reaction of the relay 28' can be triggered by different events. Thus, the unit can work, for example, with a gas sensor that is susceptible to harmful or even simply unpleasant gas concentrations in rooms. Similarly, it is possible to let the relay 28' cooperate with a sound sensor that reacts when a certain external noise level is exceeded and which so adjusts the make-break switch 28 (via the relay 28') that the ventilation appliance closes automatically when it is in its open position.

It is obvious that the circuit arrangement of FIGS. 1 to 4 can also be used in conjunction with the ventilation appliance of FIGS. 5 to 8 and that, vice versa, the circuit arrangement of FIGS. 5 to 8 can also be used for motion control of the sliding doors of FIGS. 1 to 4. In the latter case, the disc cam 23' would naturally not be directly driven by the driven shaft 24, but would be driven with the intervention of a so-called "repeating" gear, which serves to bring the angular velocity of the disc cam into proportionate agreement with the linear regulating path of the door wings 1' and 1". It can be seen, then, that the safety control units described above and claimed hereinafter can be used practically anywhere in daily life that it is important to control power-operated components in accordance with the rules for accident prevention, so that the risk of jamming person and objects is eliminated.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Safety control unit for a closure member movable between an open position and a closed position, comprising:
   (a) a single-phase A.C. synchronous motor having a rotor that rotates either clockwise or counterclockwise and which automatically reverses its direction of rotation when the rotor encounters a braking resistance,
   (b) drive means operatively connected to the rotor and the closure member for causing the closure member to move to the closed position when the rotor rotates in one direction and to move to the open position when the rotor rotates in the opposite direction,
   (c) means for obstructing the movement of the closure member in the open and closed positions to impart a braking resistance to the rotor,
   (d) a source of electrical power,
   (e) a first limit switch connected to the motor and which reverses when the closure member is in the closed position,
   (f) a second limit switch connected to the motor and which reverses when the closure member is in the open position, and
   (g) a manually-operated control switch for selectively connecting either of said first and second limit switches to the source of electrical power, whereby energization of the motor through said control switch causes the rotor to rotate in said one direction when the closure member is in the open position and in the opposite direction when the closure member is in the closed position, the direction of rotation of the rotor automatically reversing when the closure member is obstructed during its movement in either direction.

2. Safety control unit as recited in claim 1, wherein the first limit switch is located adjacent the closed position of the closure means and the second limit switch is located adjacent the open position of the closure means, the closure member being provided with a cam element that opens the first and second limit switches when the closure member is in the closed and open positions, respectively.

3. Safety control unit as recited in claim 1, comprising a sensor-actuated relay including a make-break switch located in the electrical connection between one of limit switches to said control switch and operable to connect the control switch to one of said limit switches when the relay is de-actuated and operable to connect the control switch to the other of said limit switches when the relay is actuated.

4. Safety control unit as recited in claim 1, wherein the drive means is a crank rotatably driven by the rotor and has two diametrically opposed dead-center positions co-inciding with the open and closed positions of the closure member and wherein a cam is rotatably driven by the rotor and is effective to close one of the limit switches in one of said dead-center positions and the other of the limit switches in the other of said dead-center positions.

5. Safety control unit for a closure member movable between an open position and a closed position, comprising:
   (a) a single-phase A.C. synchronous motor having a rotor that rotates either clockwise or counterclockwise and which automatically reverses its direction of rotation when the rotor encounters a braking resistance,
   (b) drive means operatively connected to the rotor and the closure member for causing the closure member to move to the closed position when the rotor rotates or to move to the open position when the rotor rotates,
   (c) means for obstructing the movement of the closure member in the open and closed positions to impart a braking resistance to the rotor,
   (d) a source of electrical power,
   (e) a first limit switch connected to the motor and which reverses when the closure member is in the closed position,
   (f) a second limit switch connected to the motor and which reverses when the closure member is in the open position, and
   (g) a manually-operated control switch for selectively connecting either of said first and second limit switches to the source of electrical power, whereby energization of the motor through said control switch causes the rotor to rotate when the closure member is in the open position or when the closure member is in the closed position, the direction of rotation of the rotor automatically reversing the motion of the closure member when it is obstructed during its movement in either direction, the drive means consisting of a crank rototably driven by the rotor and having two diametrically opposed dead-center positions coinciding with the open and closed positions of the closure member, a cam being rotatably driven by the rotor and effective to close one of the limit switches in one of said dead-center positions and the other of the limit switches in the other of said dead-center positions.

6. Safety control unit as recited in claim 5, wherein the first limit switch is located adjacent the closed position of the closure means and the second limit switch is located adjacent the open position of the closure means the closure member being provided with a cam element that opens the first and second limit switches when the closure member is in the closed and open positions, respectively.

7. Safety control unit as recited in claim 5, comprising a sensor-actuated relay including a make-break switch located in the electrical connection between one of limit switches to said control switch and operable to connect the control switch to one of said limit switches when the relay is de-actuated and operable to connect the control switch to the other of said limit switches when the relay is actuated.

* * * * *